United States Patent [19]
Wasson

[11] Patent Number: 4,467,386
[45] Date of Patent: Aug. 21, 1984

[54] FAIL-SAFE SENSOR CIRCUIT

[75] Inventor: Richard A. Wasson, Mount Laurel, N.J.

[73] Assignee: RCA Corporation, New York, N.Y.

[21] Appl. No.: 442,239

[22] Filed: Nov. 17, 1982

[51] Int. Cl.³ .............................................. H02H 7/20
[52] U.S. Cl. .................................. 361/106; 361/103; 219/501
[58] Field of Search ......................... 361/106, 103, 27; 219/501, 505; 307/117; 219/497

[56] References Cited

U.S. PATENT DOCUMENTS

| | | | |
|---|---|---|---|
| 3,241,026 | 3/1966 | Andrich | 361/58 X |
| 3,500,074 | 3/1970 | Obenhaus | 361/106 X |
| 3,942,075 | 3/1976 | Maran et al. | 361/106 |
| 4,075,674 | 2/1978 | Squiers et al. | 361/106 X |
| 4,266,257 | 3/1981 | Rudich, Jr. | 361/106 X |
| 4,281,358 | 7/1981 | Plouffe et al. | 361/106 X |
| 4,320,285 | 3/1982 | Koether | 361/106 X |

*Primary Examiner*—Patrick R. Salce

*Attorney, Agent, or Firm*—Joseph S. Tripoli; Robert L. Troike; Robert Ochis

[57] ABSTRACT

A sensor circuit includes a measurement signal generator which includes a sensing element having an impedance which varies in response to changes in a sensed parameter. The sensor circuit also includes a reference signal generator, a comparator and a variable impedance connected in circuit with the measurement signal generator for loading the measurement signal generator. The comparator produces a control signal for activating a control system when the measurement signal has a predetermined relationship to the reference signal. The variable impedance renders the sensor circuit fail-safe. An abnormal (failure) operating condition of the sensor element which would cause the measurement signal to have the predetermined relationship to the reference signal, instead causes the variable impedance to load the measurement signal generator to force it to generate an override measurement signal. The override measurement signal is one which does not have the predetermined relationship to the reference signal whereby the abnormal operation of the sensor element does not activate the control system.

6 Claims, 3 Drawing Figures

FAIL-SAFE SENSOR CIRCUIT

The United States government has rights in this invention pursuant to contract number N00024-81-C-5145 awarded by the Department of the Navy.

The present invention relates to the field of sensing circuits and more particularly to fail-safe sensing circuits.

Thermistors are widely used to sense temperature. A thermistor whose resistance increases with decreasing temperature (i.e. a negative temperature coefficient thermistor) can be used to generate a temperature measurement signal which is applied as one input to a comparator circuit. A separately provided reference signal comprises the other input to the comparator circuit. The comparator produces a control signal to turn on a heater when the thermistor crosses over a critical resistance level (at a critical temperature). The heater may be used to offset the effects of further decreases in the temperature of the local environment. When the temperature in the vicinity of the thermistor rises above the critical temperature the thermistor resistance decreases enough to cause the comparator output signal to change such that the control signal will turn the heater off. Such systems are quite effective during normal operation of the thermistor. Unfortunately, such thermistors are subject to failure by becoming open circuits. Under such conditions the heater turn-on signal can be generated at all times independent of the actual thermistor temperature. This can lead to a catastrophic failure of the workpiece which the heater was intended to protect especially when that workpiece is already in a warm environment.

In the prior art, an additional comparator is sometimes used to detect an open-circuited thermistor. When the open-circuit sensing comparator produces an open-thermistor signal, associated logic circuitry inhibits the thermistor generated heater turn-on signal from activating the heater. The additional comparator, its source of a reference signal and its associated logic circuitry increase the cost and complexity of the system. This complexity can also include a requirement for multiple supply voltages. The increased complexity can cause a reduction in system reliability.

A parameter sensing circuit is therefore desired which is relatively simple, inexpensive and yet substantially fail-safe in operation.

A circuit in accordance with one preferred embodiment of the present invention includes means for generating a measurement signal representative of a parameter to be sensed. The means for generating includes a sensing element having an impedance which varies in response to changes in the sensed parameter. A means is provided for generating a reference signal which is substantially independent of the parameter to be sensed. The measurement signal and the reference signal are coupled to a comparator which produces a control signal for activating a control system when the measurement signal has a predetermined relationship to the reference signal. In this embodiment the circuit further comprises a variable impedance means connected in circuit with the means for generating for providing a load impedance when the impedance of said sensing element reaches a certain level (i.e. an abnormal level). The variable impedance means is effectively non-conductive relative to the means for generating in response to operation of the sensor element within a given range of sensor impedance levels (i.e. normal range). The means for generating provides an override measurement signal when the impedance of the sensor element is outside of the given range. The override measurement signal is one which does not have the predetermined relationship to the reference signal whereby the operation of the sensor element outside of the given range does not activate the control system. In one preferred embodiment the parameter to be sensed is temperature and the sensing element is a thermistor or similar temperature sensing device.

Figure 1:
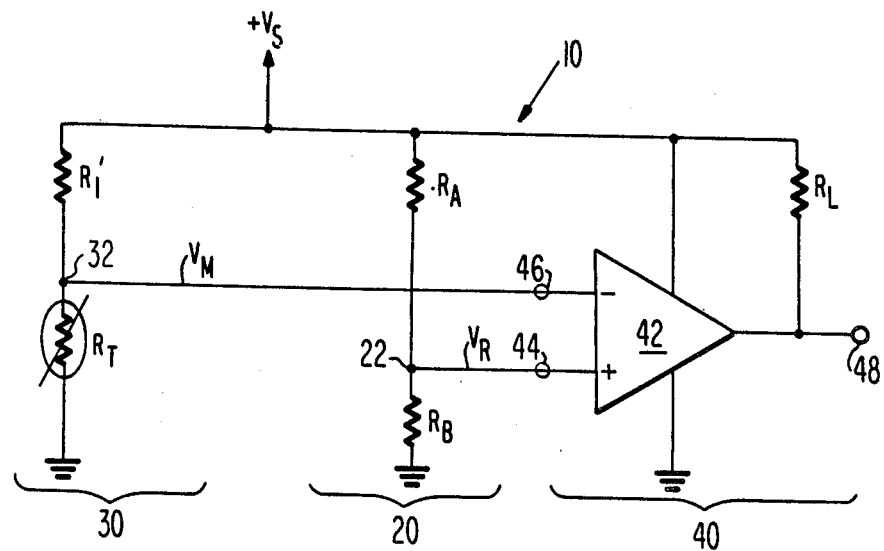
FIG. 1 is a schematic illustration of a prior art thermistor temperature sensing circuit.

A prior art thermistor temperature sensing circuit 10 is illustrated in FIG. 1 in a schematic diagram. This circuit comprises reference and measurement resistive voltage dividers 20 and 30 respectively, each coupled across a source of potential. Also included in circuit 10 is a comparator circuit 40 having a control signal output terminal 48. A control input terminal of a temperature control system (not shown) is coupled to terminal 48.

The reference voltage divider 20 comprises a series connection of first and second substantially temperature insensitive resistors $R_A$ and $R_B$. At a reference voltage node 22, divider 20 provides a reference voltage $V_R$ which is substantially independent of temperature.

The measurement voltage divider 30 comprises a series connection of a substantially temperature insensitive resistor $R_1'$ and a temperature sensitive device $R_T$ (e.g. a thermistor) whose resistance varies with temperature. At a measurement voltage node 32, divider 30 generates a measurement voltage $V_M$ which is related to the temperature of the device $R_T$. The voltage $V_M$ is a temperature measurement signal. The temperature sensitive device $R_T$ is the temperature sensing element. $R_T$, in FIG. 1, is a thermistor which has a resistance versus temperature characteristic such as that illustrated in the graph of FIG. 3.

The comparator circuit 40 comprises an integrated circuit comparator 42 and a load resistor $R_L$. The control signal output terminal 48 is connected to the junction of the load resistor $R_L$ and the comparator 42. The temperature control system (not shown) which is responsive to sensing circuit 10 has its control input coupled to terminal 48. That temperature control system controls the operation of a heater (not shown) which may be an electric resistance heater. The comparator 42 has a positive or non-inverting input terminal 44 and a negative or inverting input terminal 46. The positive input terminal 44 is connected to the reference voltage node 22. The negative input terminal 46 is connected to the measurement voltage node 32. Comparator 42 provides a high output voltage at terminal 48 whenever the measurement voltage at its negative input terminal 46 is less than or equal to the reference voltage at its positive input terminal 44. When the measurement voltage at terminal 46 becomes greater than the reference voltage at terminal 44, comparator 42 changes states and the voltage at output terminal 48 goes to a low value. A low voltage at the terminal 48 is a control signal which causes the responsive temperature control system (not shown) to activate its heating system (not shown).

Figure 3:
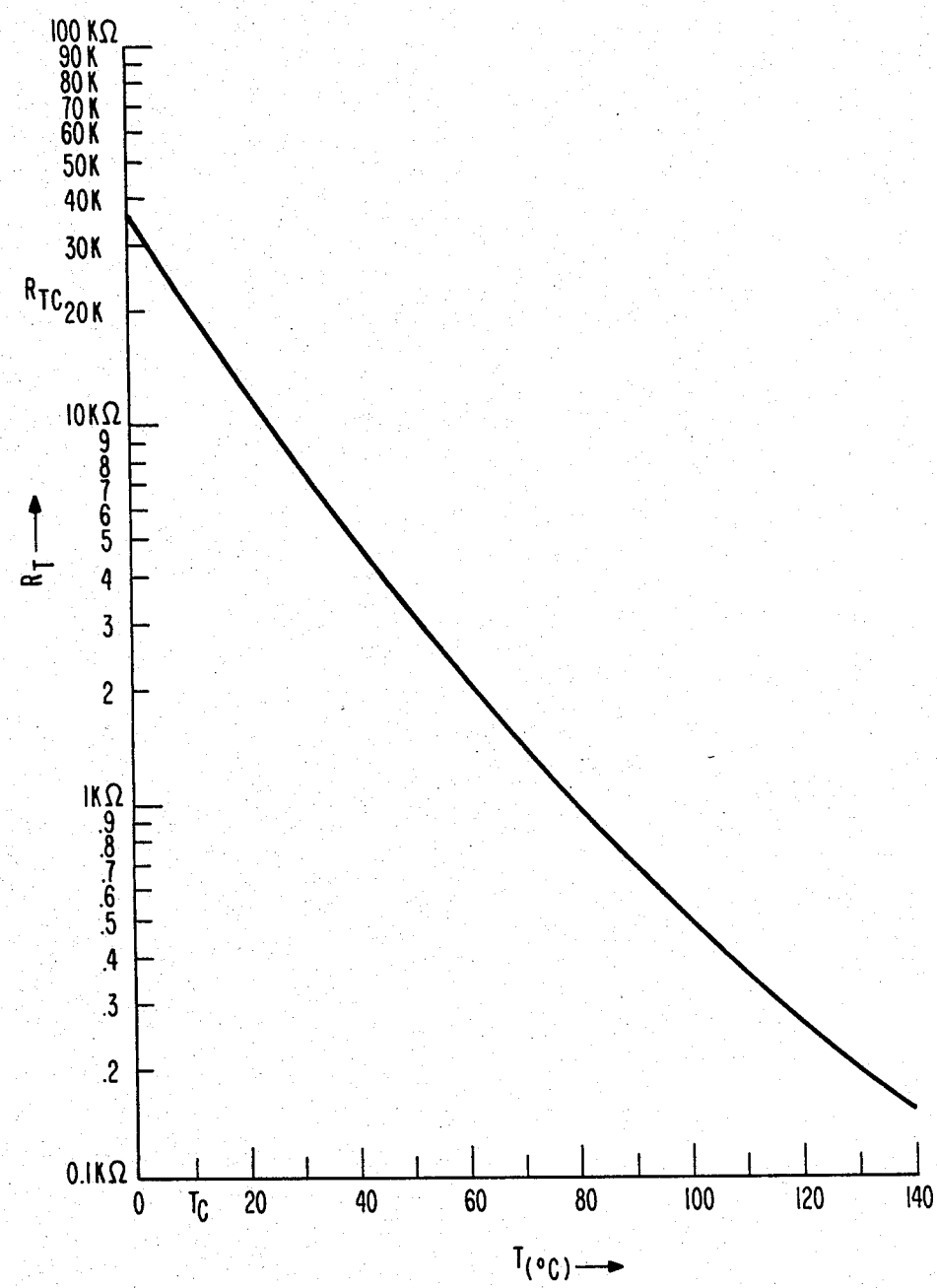
FIG. 3 is an illustration of the resistance versus temperature characteristic of one type of thermistor suitable for use in the circuits of FIGS. 1 and 2.

The sensing circuit is designed to change states, and thus its output signal, at a critical temperature $T_C$ such as 10° C. The thermistor $R_T$ has a resistance value $R_{TC}$ at the critical temperature $R_C$. $R_{TC}$ is 21.1K ohms at 10° C. for the thermistor whose characteristics are illustrated in FIG. 3. The values of the resistors $R_A$ and $R_B$ are selected to provide a particular reference voltage. The value of the resistor $R_1'$ is selected so that at the critical resistance $R_{TC}$ of the thermistor, the measurement voltage $V_M$ provided to terminal 46 of the comparator 42 will be the same as the reference voltage $V_R$. Typical values in this circuit for a critical temperature of 10° C. are $R_A=32K$ ohms, $R_B=20K$ ohms, $R_1'=13.2K$ ohms and $R_{TC}=21.1K$ ohms.

If thermistor $R_T$ fails by becoming an open circuit (or at least an abnormally high impedance) the voltage at the measurement node 32 will rise toward the supply voltage $+V_s$. In response, comparator 42 produces a low output signal which the temperature control system (not shown) connected to the output 48 treats as a heater turn-on signal. This causes activation of its heater system. This is an undesirable and potentially dangerous condition when the actual local environmental temperature sought to be controlled is already substantially above $T_C$.

Figure 2:
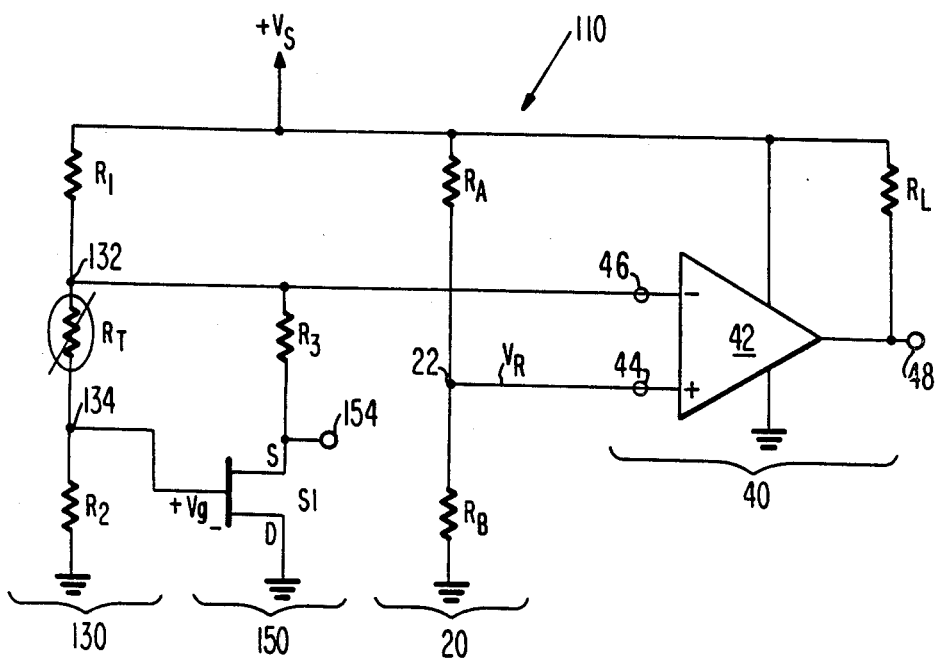
FIG. 2 is a schematic diagram of a fail-safe thermistor temperature sensing circuit in accordance with the present invention.

In FIG. 2 a fail-safe thermistor temperature control circuit in accordance with the present invention is illustrated. This sensing circuit includes a reference voltage divider 20 and a comparator circuit 40 similar to that shown in FIG. 1. It also includes a modified temperature measurement voltage divider 130 and an impedance means or loading means 150. Loading means 150 comprises a switch $S_1$ and a resistor $R_3$ and loads the temperature measurement voltage divider 130 in the event that the thermistor becomes effectively an open circuit. The sensing circuit 110 shown in FIG. 2, is powered by a single source of potential, $+V_s$, which may be a battery or a d.c. power supply.

The temperature measurement voltage divider 130 comprises a series connection of three resistors ($R_1$, $R_T$ and $R_2$) between the positive power supply $+V_s$ and ground. The common node 132 of the resistor $R_1$ and the thermistor $R_T$ constitutes the temperature measurement voltage node for this divider. The common node 134 of thermistor $R_T$ and resistor $R_2$ constitutes a thermistor condition sensing node. The thermistor may preferably be an L1725A thermistor assembly manufactured by Gulton Industries of Netuchen, N.J.

The LM139 integrated circuit comparator manufactured by National Semiconductor is preferred as the comparator 42 in circuit 110. This comparator has feedback built into it which ensures that there is sufficient hysteresis to prevent uncontrolled on-off switching of the comparator at the critical temperature.

The resistors $R_1$ and $R_2$ in the temperature sensing voltage divider 130 are selected to provide a measurement voltage at the node 132 which is substantially equal to the reference voltage when the thermistor $R_T$ is at its critical resistance.

The resistor $R_2$ is selected to have a value which ensures that the voltage at the node 134 will be at least $V_{th}$ volts whenever the thermistor $R_T$ is not effectively an open circuit. $V_{th}$ is the threshold voltage of an FET transistor which forms the switch $S_1$. Its significance is discussed subsequently.

In this specification what is meant by the thermistor becoming effectively an open circuit is that the thermistor obtains a resistance level which is higher than the maximum it can obtain under any normal operating conditions and temperatures. If that maximum normal operating resistance of the thermistor is 100K ohms, then a resistance of 150K ohms may be considered effectively an open circuit. The exact resistance value at which the thermistor is treated as being "effectively an open circuit" is determined by the value of the resistors $R_1$ and $R_2$, the source voltage $+V_s$ and the threshold voltage $V_{th}$ of the switch $S_1$.

The loading means 150 comprises a series connection of a resistor $R_3$ and the switch $S_1$ coupled between the measurement node 132 and a point of reference potential, i.e. ground. The control or gate electrode of the FET switch $S_1$ is connected to the thermistor condition sensing node 134. The FET has the characteristic that it remains an open circuit so long as its gate or control voltage $V_q$ is at least a threshold voltage $V_{th}$ more than its drain voltage. One appropriate FET for use in this circuit is the 1H5012 analog switch manufactured by Intersil. This device functions in this circuit as a depletion mode FET.

The value selected for the resistor $R_2$ ensures that the voltage $V_g$ will always be greater than the voltage $V_{th}$ during normal operation of the thermistor. However, if the thermistor $R_T$ becomes effectively an open circuit, the voltage at node 134 becomes insufficient to hold switch $S_1$ open. The thermistor $R_T$ becoming effectively an open circuit is an abnormal operating condition or failure mode of the thermistor which in circuit 10, shown in FIG. 1, would cause the measurement signal to be greater than the reference signal. However, in circuit 110, shown in FIG. 2, this condition causes the voltage at the node 134 to approach within the voltage range $V_{th}$ of ground (to become ground voltage in the event of zero current). This turns switch $S_1$ on and creates a current path from node 132 to ground through resistor $R_3$ and the main conduction path of switch $S_1$. The value of the resistor $R_3$ is selected to ensure that the resulting current will place a sufficient load on divider 130 to hold the measurement voltage $V_M$ at the node 132 at less than the reference voltage $V_R$. This will be the case so long as the resistance $R_3$ plus any resistance in the switch $S_1$ is less than ($R_{TC}+R_2$). However, for a margin of safety it is preferred that resistor $R_3$ be less than 60% of $R_{TC}$. Whenever switch $S_1$ is closed, the presence of the current path from node 132 to ground through the resistor $R_3$ and switch $S_1$ loads the measurement voltage divider 130 by drawing additional current from measurement node 132. This increases the current through resistor $R_1$ and thus the voltage across resistor $R_1$. For a fixed voltage source $+V_2$ this reduces the voltage at node 132. Thus, this loading forces the measurement voltage divider to generate an override measurement signal at node 132 which is different from what would occur if the loading means were absent. This override measurement signal is a voltage $V_M$ which is less than $V_R$. As a result, the comparator 42 does not produce a heater turn-on signal. Thus, loading means 150 ensures that an open thermistor $R_T$ cannot cause a heater turn-on signal.

When thermistor $R_T$ is operating normally, switch $S_1$ is open and loading means 150 draws no current from measurement node 132. Thus, loading means 150 does not load the measurement signal generator during normal operating of the thermistor.

If desired, a separate output terminal 154 may be connected to the junction between the switch $S_1$ and the resistor $R_3$ to provide an open-sensor output signal. When the thermistor $R_T$ is open circuited, the closure of switch $S_1$ causes the voltage at terminal 154 to approach ground voltage.

Typical values for the resistors in circuit 110 for a supply voltage of 24 volts and a critical temperature of 10° C. are $R_A=32K$ ohms, $R_B=20.2K$ ohms, $R_1=62K$ ohms, $R_2=20K$ ohms, $R_3=21.5K$ ohms, and $R_{TC}=21.1K$ ohms. The threshold voltage for the switch $S_1$ is typically 4.5 volts.

A single-comparator, single power supply voltage fail-safe thermistor temperature sensing circuit has been illustrated and described. This circuit ensures that a heater turn-on signal is only provided in response to a thermistor having a resistance in its normal operating range. If desired, this circuit can provide a signal indicative of an open circuited thermistor. Other sensing devices such as positive temperature coefficient thermistors and other switches such as enhancement mode FET's may be used in accordance with this invention with appropriate modifications of the circuit.

What is claimed is:

1. A circuit for supplying a control signal comprising:
   means for generating a measurement signal representative of a parameter to be sensed;
   means for providing a reference signal which is substantially independent of said parameter; and
   comparison means for comparing said reference signal and said measurement signal for producing said control signal with a first value when said measurement signal has a predetermined relationship to said reference signal and producing said control signal with a different value when said measurement signal does not have said predetermined relationship to said reference signal; and
   said means for generating including a sensor element and switchable impedance means;
   said sensor element having an impedance which varies in response to changes in said sensed parameter, said sensor element being susceptable to failure in an operating condition which would cause said means for generating to produce said measurement signal with said predetermined relationship to said reference signal;
   said switchable impedance means connected in circuit with said sensor element and responsive to only said failure in said sensor element for providing a load impedance across said sensor element, said load impedance being of a value to produce said measurement signal that does not have said predetermined relationship to said reference signal whereby said failure mode operation of said sensor element is prevented from causing said comparison means to produce said control signal with said first value.

2. A circuit for supplying a control signal to a temperature controlled system comprising:
   means for generating a measurement signal representative of a temperature to be sensed;
   means for providing a reference signal which is substantially independent of temperature; and
   means for comparing said reference signal and said measurement signal for producing said control signal for activating said temperature controlled system when said measurement signal has a predetermined relationship to said reference signal;
   said means for generating including:
      a sensor element, and
      switchable impedance means connected in circuit with said sensor element, said impedance means being effectively non-conductive relative to said sensor element in response to normal operation of said sensor element;
   said switchable impedance means:
      being responsive to the operating condition of said sensor element for providing a circuit path for by-passing said sensor element in response to a failure mode condition of said sensor element, and
      causing said means for generating to provide, in response to said failure mode condition, a measurement signal which does not have said predetermined relationship to said reference signal whereby said failure mode operation of said sensor element does not activate said temperature controlled system.

3. The circuit recited in claim 2 wherein:
   said sensor element is a temperature sensing element having an impedance which varies with temperature;
   said means for generating comprises:
      (1) a first resistor, said temperature sensing element, and a second resistor connected in series between a supply potential and a point of reference potential, said first resistor and said sensing element coupled at a measurement node and said sensing element and said second resistor coupled at a second node, said measurement signal being provided at said measurement node, and
      (2) a series circuit of a third resistor and a switch connected between said measurement node and said point of reference potential, said switch being voltage responsive and having a control input coupled to said second node, said third resistor and said switch comprising said impedance means and forming a variable impedance path between said measurement node and said point of reference potential;
   said means for providing comprises a resistive voltage divider connected between said supply potential and said point of reference potential and further comprises a reference node for providing said reference signal;
   said means for comparing has a reference input coupled to said reference node and a measurement input coupled to said measurement node; and
   the values of said first resistor, said temperature sensing element and said second resistor are selected such that said second node provides a signal during normal operation of said sensing element which is sufficient to hold said switch open and in response to an open-circuited temperature sensing element provides a signal which is insufficient to hold said switch open.

4. The circuit recited in claim 3 wherein:
   said temperature sensing element has a resistance which decreases with increasing temperature in an operating temperature range.

5. The circuit recited in claim 3 wherein:
   said switch is a field effect transistor.

6. The circuit recited in claim 3 wherein:
   said third resistor has a resistance value which is less than the resistance exhibited by said temperature sensing element at the temperature at which said measurement signal and said reference signal are equal when said temperature sensing element is operating in a non-failure mode.

* * * * *